United States Patent
Futase

(10) Patent No.: US 6,814,827 B2
(45) Date of Patent: Nov. 9, 2004

(54) APPARATUS AND METHOD FOR CONNECTING FILM

(75) Inventor: Katsunori Futase, Saitama (JP)

(73) Assignee: Taisei Lamick Co., Ltd., Saitama (JP)

( * ) Notice: Subject to any disclaimer, the term of this patent is extended or adjusted under 35 U.S.C. 154(b) by 0 days.

(21) Appl. No.: 10/469,535

(22) PCT Filed: Mar. 8, 2002

(86) PCT No.: PCT/JP02/02203
§ 371 (c)(1),
(2), (4) Date: Sep. 8, 2003

(87) PCT Pub. No.: WO03/050025
PCT Pub. Date: Jun. 19, 2003

(65) Prior Publication Data
US 2004/0094257 A1 May 20, 2004

(30) Foreign Application Priority Data
Dec. 10, 2001 (JP) ........................................ 2001-375746

(51) Int. Cl.$^7$ .............................................. B65H 21/00
(52) U.S. Cl. .................... 156/157; 156/304.6; 156/502; 156/504; 156/507; 242/552
(58) Field of Search ................................ 156/157, 159, 156/304.1, 304.6, 502, 504, 507; 242/551, 552

(56) References Cited

U.S. PATENT DOCUMENTS

| 3,384,527 A | * | 5/1968 | Fener | 156/502 |
| 3,390,038 A | * | 6/1968 | Hadley | 156/159 |
| 3,420,725 A | * | 1/1969 | Curry | 156/305 |
| 3,610,547 A | * | 10/1971 | Anderson | 242/552 |
| 3,796,625 A | * | 3/1974 | Rutledge | 156/502 |
| 4,645,558 A | * | 2/1987 | Sato | 156/351 |
| 5,232,529 A | * | 8/1993 | Miyake | 156/73.4 |
| 5,573,617 A | * | 11/1996 | Franck et al. | 156/196 |
| 5,709,761 A | * | 1/1998 | Tajima et al. | 156/159 |
| 5,863,381 A | * | 1/1999 | Magota et al. | 156/507 |

FOREIGN PATENT DOCUMENTS

| JP | 54-36366 | 3/1979 |
| JP | 64-78820 | 3/1989 |
| JP | 3-216443 | 9/1991 |
| JP | 6-298421 | 10/1994 |

OTHER PUBLICATIONS

English Language Abstract of JP 6–298421.
English Language Abstract of JP 3–216443.
English Language Abstract of JP 64–78820.
English Language Abstract of JP 54–36366.

* cited by examiner

Primary Examiner—Mark A. Osele
(74) Attorney, Agent, or Firm—Greenblum & Bernstein, P.L.C.

(57) ABSTRACT

There is provided an apparatus for joining films wherein a rear end portion of a preceding film and a front end portion of a trailing film are mutually joined without using a joining material such as an adhesion tape or the like to sufficiently contribute the joint portion to heat seal likewise the other portions of the films and realize excellent liquid tightness and airtightness of the joint portion itself and also tensile strength required for the film itself is given to the joint portion. The apparatus comprises a fuse seal means arranged in the vicinity of a running path of the preceding film, a film-holding means holding the front end portion of the trailing film at a side opposite to the seal means with respect to the running path, an insert plate pushing the front end portion of the film held by the film-holding means into the seal means together with the preceding film, and an extra film removing means clamping a turnup portion of the preceding film pushed over the seal means by the insert plate and separating from a fuse-sealed portion.

15 Claims, 9 Drawing Sheets

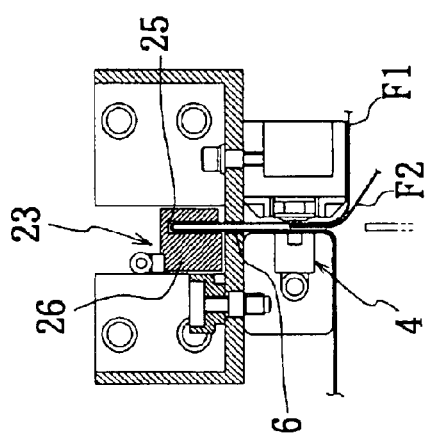
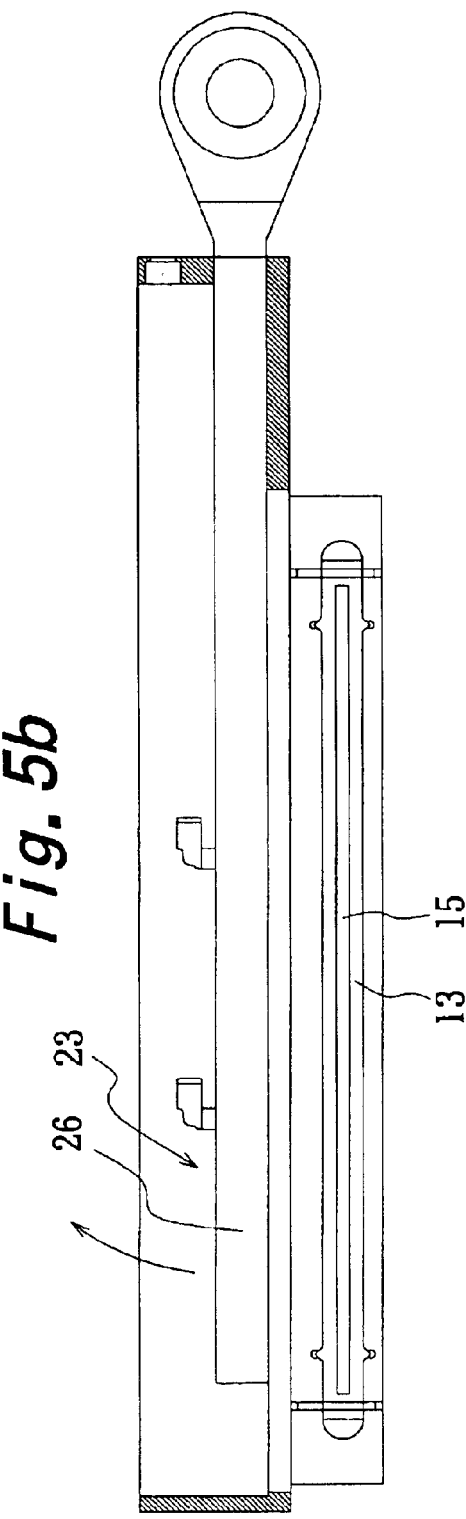
Fig. 5a
Fig. 5b

APPARATUS AND METHOD FOR CONNECTING FILM

TECHNICAL FIELD

This invention relates to an apparatus and process for joining films, particularly laminate films each comprising a thermoplastic drawn base film layer and a sealant layer and used, for example, as a film for package, and proposes a technique in which the joint portion of the films is subjected to a liquid-tight and airtight heat sealing likewise the other film portion in the manufacture of package bag or the like.

BACKGROUND ART

For example, a film for package used in a case of continuously filling and packaging a liquid, a powder or the like or a case of intermittently filling and packaging it and supplied in the manufacture of a package bag filled with a material to be filled, particularly laminate film for package is generally applied through printing step, laminating step and slitter step to an automatic filling and packaging apparatus at a state of winding in the form of roll.

In the slitter step, the cutting removal of side portions of the film is carried out for mainly making a width size of a laminate film for package after the lamination but also the laminate films for package are joined with each other in order to adjust a length of the film to be wound in the form of roll to render a total winding length of the film into, for example, a given length such as 1000 m, 2000 m or the like, and the joining of the films is conducted after a poor printed portion or a poor laminated portion is removed by cutting. For this end, about 2 to 3 joint portions of the films are existent in the wound film of 2000 m.

Also, in the packaging step for applying the laminate film for package having a specific rolled length to an automatic filling-packaging apparatus to conduct the filling and packaging of a material to be packaged, a rear end portion of a preceding film for package fed from a roll is joined to a front end portion of a trailing film for package fed from another roll, whereby the trailing film for package is passed through a given pathway of a packaging apparatus.

The joining between mutual films at the slitter step is carried out by joining these films with an adhesive tape or the like at a state of butting the rear end of one film to the front end of the other film from the old time. Also, the film joining at the filling and packaging step is carried out by overlap-joining the rear end portion of the one film to the front end portion of the other film with an adhesion tape or the like.

However, when the thus joined laminate film for package is applied to the packaging apparatus to manufacture a package bag, the adhesion tape or the like made of a material different from the laminate film for package, or the overlap of the front and rear end portions of the laminate films for package in addition to the adhesion tape or the like brings about the increase of the thickness in the laminate film for package at the joint portion of the films and also the sufficient heat transfer from a heat seal blade of the packaging apparatus to a sealant layer of a film portion contributing to the formation of the package bag is obstructed by properties inherent to the adhesive tape or the like, so that it is substantially impossible to rapidly fuse the sealant layer to a sufficient extent of fusing the mutual sealant layers.

When the continuous filling and packaging of a material to be packaged is carried out, for example, by the above laminate film for package, even if it is possible to pass the joint portion between the films through a space between a longitudinal heat seal blade and a lateral heat seal blade as a pair of rotational seal blades rotating at a constant clearance as it is, the sealant layers can not be sufficiently heat-fused due to the presence of the adhesion tape, increase of total film thickness and the like even under the heating and pressurizing action of the heat seal blades, so that there is a problem of causing leakage, scattering and the like of a liquid or other material to be packaged in the packaging apparatus.

This is also caused in a case that the joint portion is particularly located in a middle part of the package bag in up-down directions due to the fact that the mutual laminate films for package can not be joined by the adhesion force of the adhesion tape at a strength required for the package bag with sufficient liquid tightness and airtightness.

Heretofore, the whole of the packaging device or the function of a main part such as heat seal functioning part, filling part and the like is temporarily stopped at every feeding of the joint portion between the laminate films for package from the wound roll and at every film joining at the packaging device, and the filling and packaging are re-opened after the film joint portion is passed through the main part of the device. In the re-opening, the confirmation of amount of a material to be packaged in the package bag, confirmation of heat seal position and sealing state, confirmation of cutting position of the package bag and forming position of tear notch are conducted and all of them are placed within an acceptable range and thereafter the device is fully re-operated.

Therefore, there is a big problem in the operation efficiency that many time and operation steps are required over a time ranging from the temporary stop of the device as a whole or main functioning part thereof to the re-operation of the device but also there is a problem that the yield of the material lowers due to the fact that it is obliged to consume significant amounts of the laminate film for package and the material to be packaged owing to the above various confirmations.

It is, therefore, an object of the invention to provide an apparatus and a process for joining of films suitable for both of the slitter step and the packaging step, in which the mutual joining between the rear end portion of one film and the front end portion of another film are carried out without using a joining material such as adhesion tape or the like and the resulting joint portion is sufficiently contributed to the heat seal likewise the other portion of the film and the liquid tightness and airtightness of the joint portion itself are realized and further the tensile strength required to the film itself is given to the joint portion to effectively enhance the efficiency of the filling and packaging operation for the material to be packaged as a film for package and also the field of the material can be largely increased.

DISCLOSURE OF THE INVENTION

The apparatus for joining films according to the invention lies in that a rear end portion of a preceding film for package fed from a winding roll is joined to a front end portion of a trailing film for package fed from another roll, and comprises a seal means for fuse-sealing both films at a butt-seam state in the vicinity of the film running path or in the vicinity of any one of up and down and right and left portions, a film-holding means for holding the front end portion of the trailing film at a side opposite to the seal means with respect to the running path by clamping, adsorbing or the like, an insert plate for pushing the front end portion of the trailing film held by the film-holding means into the seal means together with the preceding film, and an extra film removing means for separating a turnup portion of the film pushed by the insert plate over the seal means at a clamped state from a fuse-sealed portion of the films.

In this apparatus, the rear end portion of the preceding film and the front end portion of the trailing film held by the film-holding means are pushed into the seal means by the action of the insert plate, respectively, and the turnup portion of the films pushed over the seal means is clamped by the extra film removing means and thereafter both the films are fuse-joined in a butt-seam form by the action of the fuse-seal means at a posture state of moving the insert plate backward, and subsequently the extra film removing means is moved in a direction separating away from the seal means to separate the film turnup portion from the fuse-sealed portion, whereby both the films can be joined to each other, and also the thus formed fuse-sealed portion has a high joining strength and can develop excellent airtightness and liquid tightness.

Further, the increase of film thickness at the joint portion can be effectively prevented by separating and removing the extra projected portion from the butt-seal fuse-sealed portion between both the films.

Therefore, when the mutual joining of the films for package is carried out by the above apparatus, the joining material such as adhesion tape or the like is naturally useless but also the film joint portion can be stationarily passed through the packaging device without stopping the function thereof or the like irrespectively of the joint portion produced at the slitter step or the joint portion produced at the filling and packaging step of the material to be packaged, whereby the film joint portion is sufficiently heat-fused under heating and pressing through the heat seal blade without obstructing by the increase of the film thickness and the joining material and hence such a joint portion can sufficiently contribute to the preparation of the packaging bag likewise the other portion of the film for package to develop an excellent heat seal strength.

Furthermore, the film joint portion itself has high liquid tightness and airtightness in addition to the sufficient tensile strength, so that even if the joint portion crosses the packaging bag at the middle part in the up-down directions of the packaging bag, the fear of leaking the material to be packaged therefrom or the like.

Thus, the operation efficiency in the filling and packaging of the material to be packaged can be effectively enhanced, and also the yields of the film for package and the material to be packaged can be largely improved.

When the film-holding means itself is made possible to move forward and backward to the seal means, the front end portion of the trailing film can be more easily held by the film-holding means of the backed posture without fearing the interference of the preceding film or the like.

Also, when the seal means is constructed with a pusher pushing the heater, the film to the heater or the heater to the film, the pushing of the film into the seal means through the insert plate can be sufficiently facilitated and further the proper fuse sealing can be surely conducted as is expected.

The heater is preferable to be an impulse sealer. In this case, the fuse sealing is conducted in a very short time by instant heat generation through impact current and also the fuse-sealed portion can be cooled in a short time, so that when the film is particularly provided with a thermoplastic drawing base film layer, the heat deformation of such a film layer and hence the film as a whole can be effectively prevented.

Furthermore, the film-holding means is arranged in a block moving forward and backward to the seal means, for example, lifting up and down thereto and can be constructed by a clamping plate opening and closing through an actuator or a manual operation.

The clamping of the front end portion of the film by the clamping plate can be further surely carried out under a small energy consumption as compared with the adsorption holding under a negative pressure or the like and has a merit of causing no noise. Therefore, the clamping plate is arranged in the block lifting up and down between the operating position and waiting position of the seal means, whereby the clamping of the front portion of the film through the clamping plate can be carried out safely, surely and easily at the waiting position and at the required timing.

When the actuator moving forward and backward the insert plate to the seal means is arranged in the block, the insert plate can also be moved between the position of obstructing no running of the film during the feed running and the position of operating it based on the forward and backward movement of the block, and the film can be pushed into the seal means by a small linear going stroke of the insert plate itself.

Further, the extra film removing means can be constructed with a pivoting arm moving in a direction separating from the seal means and a clamper arranged on the pivoting arm and moving forward and backward therewith.

According to this means, the turnup portion of the film can be clamped in the pivoting arm by forward moving the clamper operated, for example, with an air cylinder in agreement with the timing of the forward movement of the insert plate. In this case, such a clamping state is continued until the insert plate is moved backward to conduct the fuse sealing and the pivot arm is separated from the seal means to completely separate and cut the extra turnup portion of the film from the fuse sealed part.

In this case, the clamping of the film, which is pushed into the extra film removing means at a bending state through the insert plate, into the pivot arm without interference to the insert plate can be carried out by constructing the clasper with plural rod-shaped members moving forward through top notched parts formed in the insert plate and clamping the turnup portion of the film at places corresponding to the notched parts of the insert plate through these rod-shaped members.

In the above apparatus, it is more preferable to arrange at least one accumulate roll guaranteeing the feeding out of the preceding film at a given rate during the joining operation between both the films.

Thus, when the apparatus is applied to, for example, the slitter step, packaging step and the like of the film for package, the joining operation of the films can be conducted without stopping the steps.

More preferably, a film feeding roll is arranged at a downstream side of the accumulate roll to always ensure the steady feeding of the film.

In this case, it is preferable to arrange a stop roll clamping the film and stopping the feed running thereof between the seal means and the accumulate roll, while a length-adjusting roll producing the loosening of the film is arranged between the stop roll and the seal means.

According to this structure, the constant feeding of the preceding film is carried out by the action of the one or more accumulate rolls under the restraint of the film movement through the stop roll in the joining operation of the films, and also the length of the film required for pushing the film from the seal means to the extra film removing means is ensured by the action of the length adjusting roll, whereby the film joining is surely conducted based on the complete separation in the function between the accumulate roll and the length adjusting roll as is expected and the steady feeding of the film can be conducted in a higher accuracy.

That is, when only the accumulate roll is arranged as the stop roll, length adjusting roll or the like, it is required that the accumulate roll is operated at a high speed at a first time of the start of the film joining operation to feed the film stored therein for the steady feeding and for the pushing of the film into the seal means or the like, but it is difficult to always and properly control the high operating speed of the accumulate roll owing to difference of properties such as elastic modulus, mass and the like in accordance with the kind of the film. Also, after the pushing of the film into the seal means or the like is completed, it is required to necessarily decrease the operating speed of the accumulate roll, but it is difficult to prevent the occurrence of position shifting at the downstream side operation due to the change of tension in the fed film based on the decrease of the speed. On the contrary, when the stop roll and the length adjusting roll are arranged, the accumulate roll can be always operated at the constant speed under the function separation between the accumulate roll and the length adjusting roll to feed the film at a given speed, and also the loosening required for the joining of the films can be surely generated by the length adjusting roll, so that there can be advantageously removed the inconvenience when these rolls are not arranged.

The method of joining films according to the invention lies in that when the rear end portion of the preceding film and the front end portion of the trailing film are joined to each other by the apparatus mentioned above, an insert plate is moved forward during the feed running of the preceding film to push the front end portion of the trailing film held by a film-holding means together with the preceding film into a seal means over a given length, and then a turnup portion of the film pushed over a position of the seal means is clamped with an extra film removing means, and thereafter both the films are fuse-sealed in a butt-seam form by the seal means while changing the insert plate backward, and further the turnup portion of the film is separated from a fuse-sealed portion by pivotably moving the extra film removing means.

According to this method, the joining of the mutual films is carried out simply, rapidly and surely, and can be easily automated. Also, when the steady feeding of the film is guaranteed by the accumulate roll, the joining can be continued without stopping the operation of the slitter packaging or the like even in the joining operation of the film.

Moreover, when the front end portion of the trailing film previously held by the film-holding means is moved to a position near to the seal means prior to the forward moving of the insert plate, the holding of the front end portion of the film with the holding means can be carried out safely, surely and easily at a given timing without the interference of the running film.

When each of the films to be mutually joined is a film provided with a thermoplastic drawing base film layer and a sealant layer, the drawing base film layers of both the films can be fused in a butt-seam form by the seal means but also the sealant layers can be fused with each other. In the former case, the joint strength can be highly increased, and in the latter case, the influence of the projection portion of the fuse-cut sealed part upon the packaging operation can be lessened.

Further, when the films are fused by the impulse fuse sealing, the thermal deformation of the drawing base film layer can be advantageously suppressed by rapidness of the heating and cooling.

BRIEF DESCRIPTION OF THE DRAWINGS

FIGS. 5a and 5b views illustrating an extra film removing means.

FIG. 7 is a view illustrating an embodiment of joining both films.

BEST MODE FOR CARRYING OUT THE INVENTION

Figure 1:
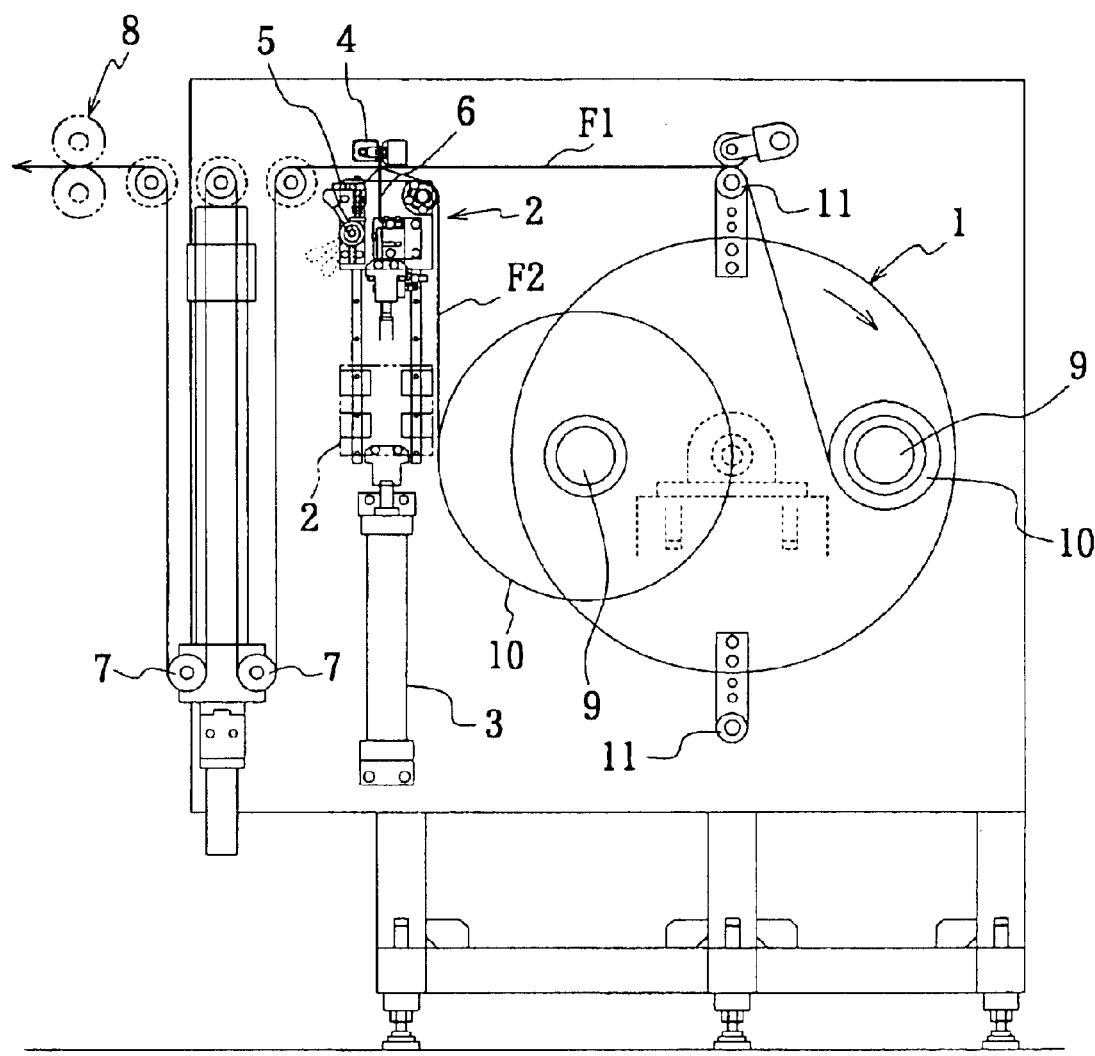
FIG. 1 is a front view illustrating an embodiment of the apparatus according to the invention.

In a front view shown in FIG. 1, numeral 1 is a turret.

The turret 1 can simultaneously support two wound films each formed by winding a laminate film for package in a roll form and can pivotably move them properly, if necessary.

Also, numeral 2 is a lifting block. The lifting block 2 moving up and down between a solid line position and a phantom line position in the figure by a cylinder 3 is arranged in opposite to a seal means 4 at a distance from the running path of the film and supports a film-holding means 5 and an insert plate 6 as mentioned later.

Numeral 7 is two accumulate rolls arranged from the lifting block 2 and the seal means 4 toward a running side of the film. These rolls 7 are moved up and down with respect to a fixed roll to increase or decrease an intentionally created loosening of the film engaged therewith and function to guarantee a constant speed feeding in the operation of joining the films.

Numeral 8 is a pair of film feeding rolls capable of arranging in a packaging apparatus or a slitter apparatus or the like and ensures the constant running of the film in the apparatus.

In many cases, the turret 1 supports a wound film 10 now fed with a rotating support shaft 9 located at a left side of the figure under an action of braking force, and also supports a wound film 10 subsequently fed with a rotating support shaft 9 located at a right side, and pivotably moves by 180° in a clockwise direction for functioning to transpose the wound films 10, 10 prior to the start of the film joining operation. FIG. 1 shows a state of completing such an transposing. Moreover, the interference of the feed running film F1 with the other constructional member or the like in such a transposing is obstructed by the action of a guide roll 11 arranged on the turret 1 through an arm.

Figure 2:
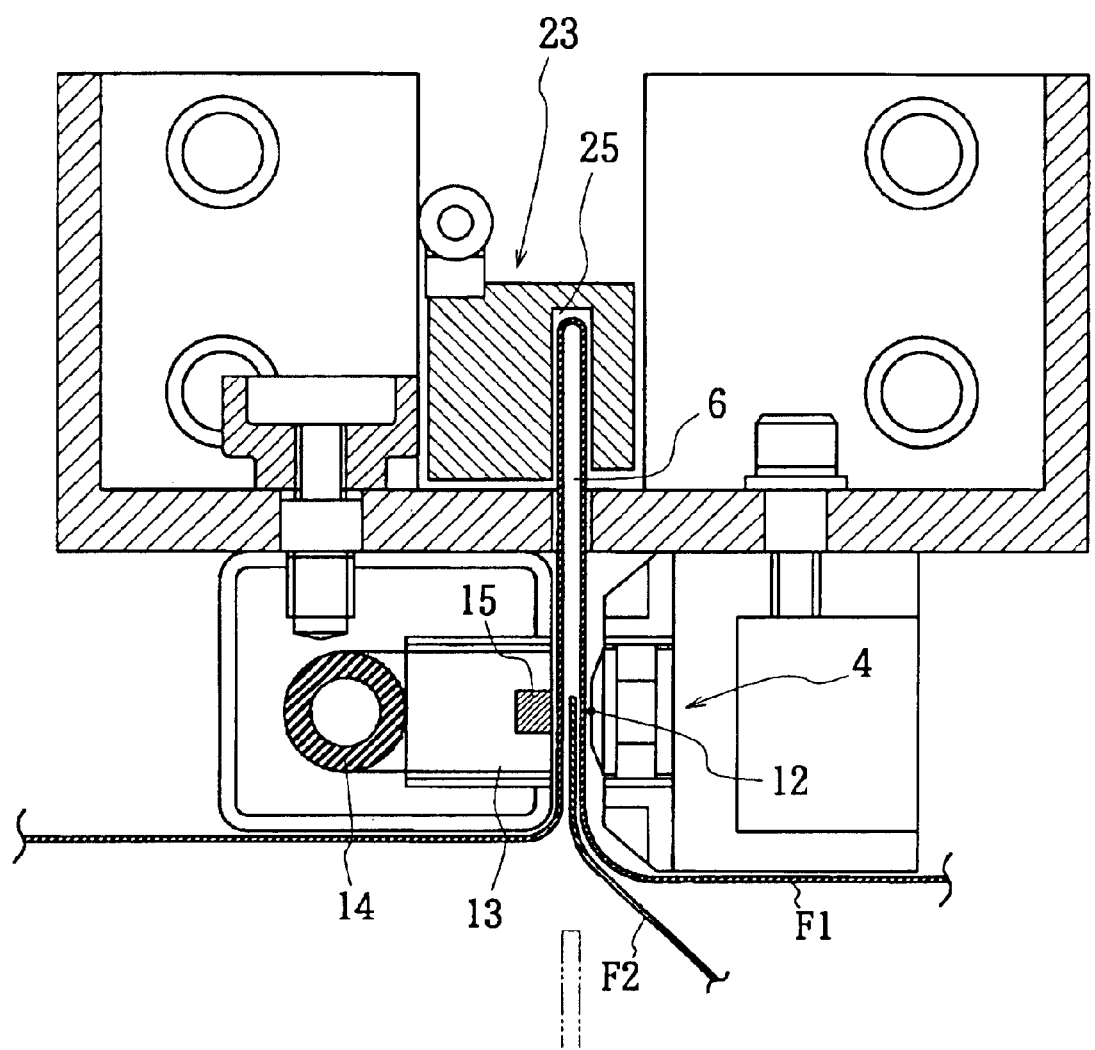
FIG. 2 is an enlarged section view illustrating a seal means.

The seal means 4 opposing to the lifting block 2 at a distance from the running path of the film can be constructed by a heater, for example, an impulse sealer 12 and a pusher 13 in opposition to the sealer 12 and usually arranged at a distance separated therefrom as shown by an enlarged section view in FIG. 2. The pusher 13 can be moved forward and backward based on the size-scalable deformation of a tube cylinder 14 made of, for example, an air bag arranged behind thereof.

In the figure, the pusher 13 attached with a silicone rubber 15 to a portion corresponding to the impulse sealer 12 is moved forward by the enlarging deformation of the tube cylinder 14 to push the film onto the sealer 12 and moved backward by the reducing deformation of the cylinder 14 under the adhesion thereto. Moreover, the backward movement of the pusher 13 can be conducted by the action of a return spring instead of the adhesion to the tube cylinder 14 or in addition thereto.

The pusher may be arranged at the side of the impulse sealer. In this case, the impulse sealer is arranged on the top of the pusher.

Figure 3:
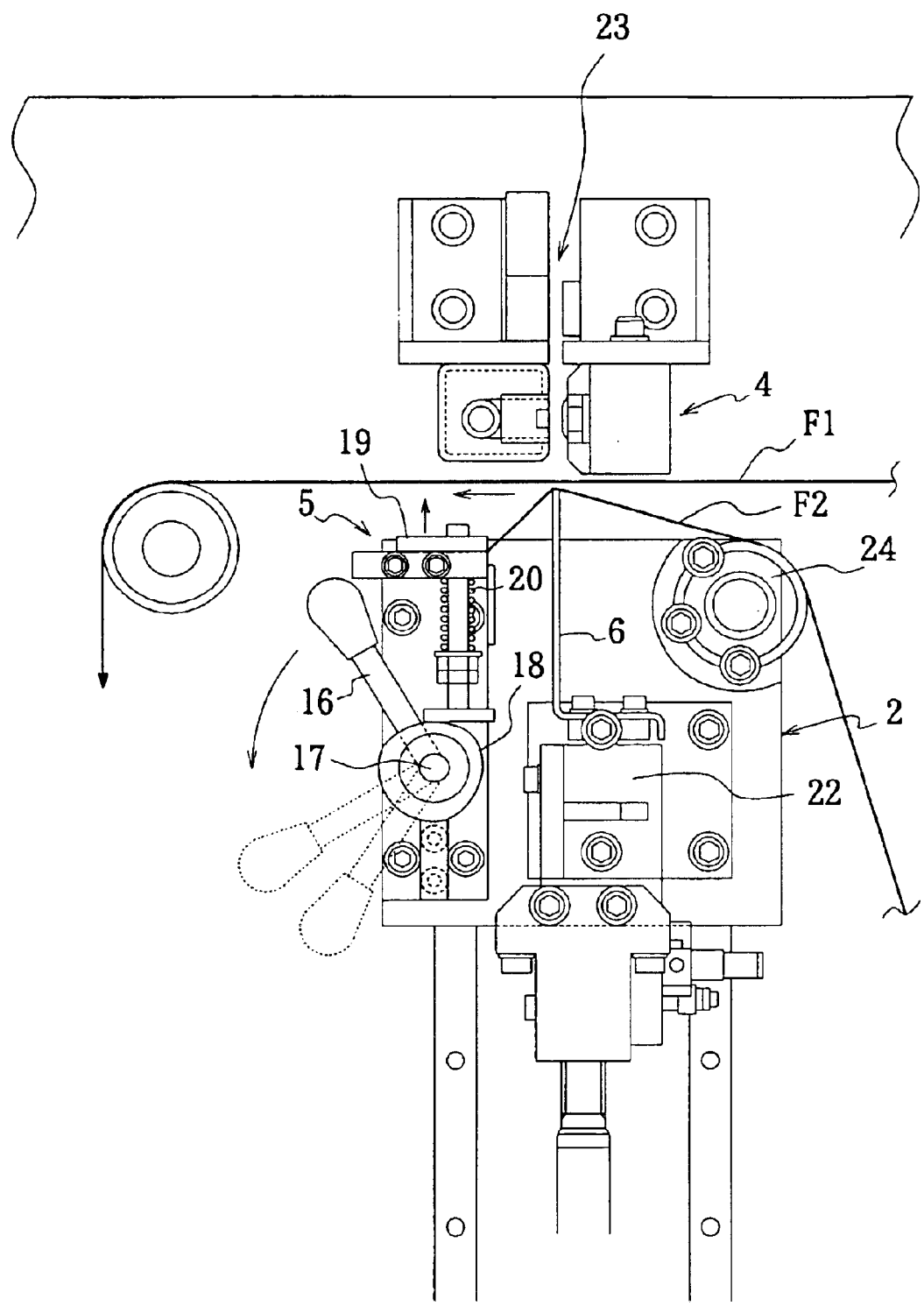
FIG. 3 is an enlarged view illustrating a film-holding means.

Moreover, the film-holding means 5 arranged on the lifting block 2 can be constructed by a clamping plate 19 lifting up and down and hence opening and closing by, for example, plural cams 18 attached to a shaft 17 pivoted by a manual operating lever 16 and having a length exceeding a film width as enlargedly shown in FIG. 3. In this case, it is preferable that a spring 20 always energizing the clamping plate 19 in a closing direction is arranged on a rod connecting a cam follower to the clamping plate 19.

According to such a film-holding means 5, the clamping plate 19 can be opened by pivoting the cam 18 through the operation of the level 16 against the spring force of the spring 20, while the level 16 and hence the cam 18 is returned to the illustrated original position under the pushing of the front end portion of the subsequently fed film beneath the clamping plate 19 to close the clamping plate 19 by the spring force of the spring 20, whereby the clamping of the front end portion of the film can be surely realized.

Figure 4:
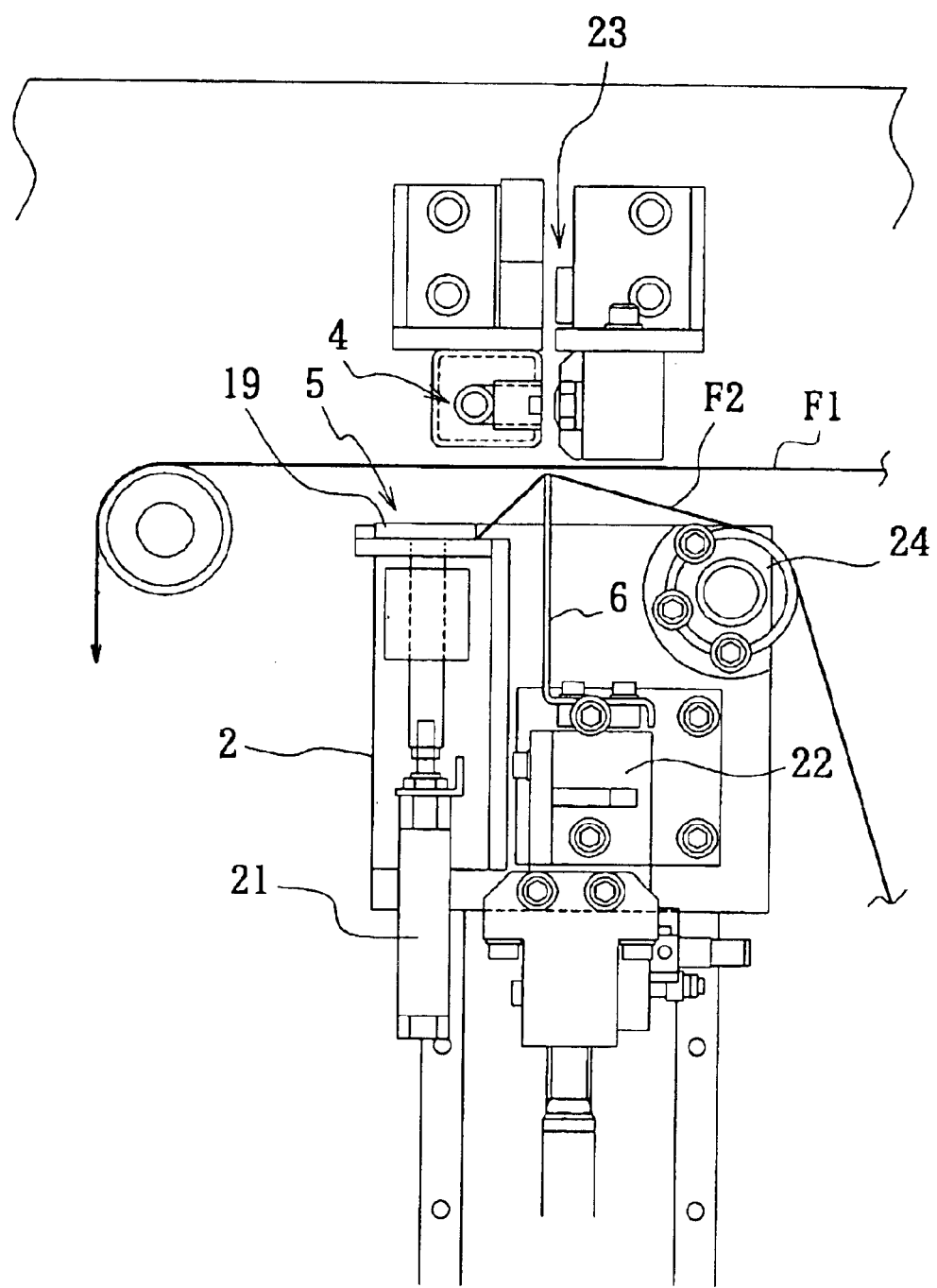
FIG. 4 is a view illustrating another film-holding means.

FIG. 4 is a view illustrating another embodiment of the film-holding means 5, which is possible to be openably and closably operated in up-down directions by at least one actuator attaching the clamping plate 19 having a given length to the lifting block 2, for example, a plurality of cylinders 21 arranged in a direction perpendicular to a paper surface of the figure. In this case, the apparatus structure can be simplified as compared with the former case of the film-holding means and the opening and closing operation of the clamping plate 19 can be automatically conducted.

The insert plate 6 operating in a vertical plane is located just beneath an actuator arranged on the lifting block 2 in a direction opposite to the running direction of the film with respect to the film-holding means 5, for example, the seal means 4 attached to a cylinder 22 as shown in FIGS. 3 and 4, and a top thereof is moved through the seal means 4 to an extra film removing means 23 arranged at an upper side thereof by the operation of the cylinder 22.

Since the insert plate 6 has usually a width exceeding the film width, when the insert plate 6 is moved upward by one cylinder 22, it is preferable that at least one guide rod projected downward from the insert plate 6 is inserted into a guide sleeve or the like formed on the lifting block 2 to stop the turning of the insert plate 6.

Moreover, the lower limit position of the top of the insert plate 6 is possible to be below the upper face of the lifting block 2, but may be located at a position projecting toward the upper side of the lifting block 2 as shown in the figure. In the latter case, the cylinder 22 can be miniaturized by decreasing the stroke amount in the operation of the insert plate 6. In this case, the subsequently feeding and running film F2 is bent in substantially a V-shaped form by clamping the front end portion with the film-holding means 5 while engaging the film F2 with a guide roll 24 arranged on the lifting block 2, but the occurrence of flaws on the film F2 or the like can be effectively prevented by curving the top face of the insert plate 6.

Further, the extra film removing means 23 arranged just above the seal means 4 and clamping the turnup portion of the film pushed based on the forward movement of the insert plate 6, particularly the feed running film F1 has a groove portion 25 allowing the insertion of the insert plate 6 and the film turnup portion as shown in FIG. 5. In this case, it comprises a pivot arm 26 pivoting in the vertical face to move away from the seal means 4, and a clamper 28 arranged at one side of the groove portion 25 of the pivot arm 26 and constructed with three rod-shaped members 28a in the illustrated embodiment moving forward and backward by the same tube cylinder 27 as mentioned above or a return spring in addition thereto as shown by a section perspective view of a main part in FIG. 6. The clamper 28 is moved forward to a position corresponding to a notch portion 29 formed in the top portion of the insert plate 6 when the insert plate 6 reaches to its upper limit position while forming the turnup portion in the film F1, and functions to clamp the turnup portion of the film F1 and sometimes the front end portion of the film F2 between the opposite side part of the groove portion 25 of the pivot arm 26 without interference with the insert plate 6.

When the front end portion of the trailing film F2 for package is joined to the rear end portion of the preceding film F1 for package by the apparatus having the above construction, the turret 1 is first pivotably moved to render both the wound films 10 supported thereon into such a posture that the trailing film F2 is located at a side of the lifting block 2 as shown in FIG. 1, and then the front end portion of the film F2 is clamped by the clamping plate 19 of the film-holding means 5 at a descending state of the block 2 as shown by a phantom line in FIG. 1.

Thereafter, the lifting block 2 is rendered into a lifting posture as shown in FIGS. 3 and 4, and the insert plate 6 is moved forward under the guarantee of the steady feed running of the film F1 by the rising operation of both the accumulate rolls 7 as shown in FIG. 2, whereby the front end portion of the film F2 clamped by the film-holding means 5 is pushed into the seal means 4 against the film holding force of the film-holding means 5, while the turnup portion is formed in the preceding film F1 fed on the basis of the occurrence of loosening under the action of the accumulate rolls 7 and pushed up to the extra film removing means 23 over the seal means 4.

Figure 6:
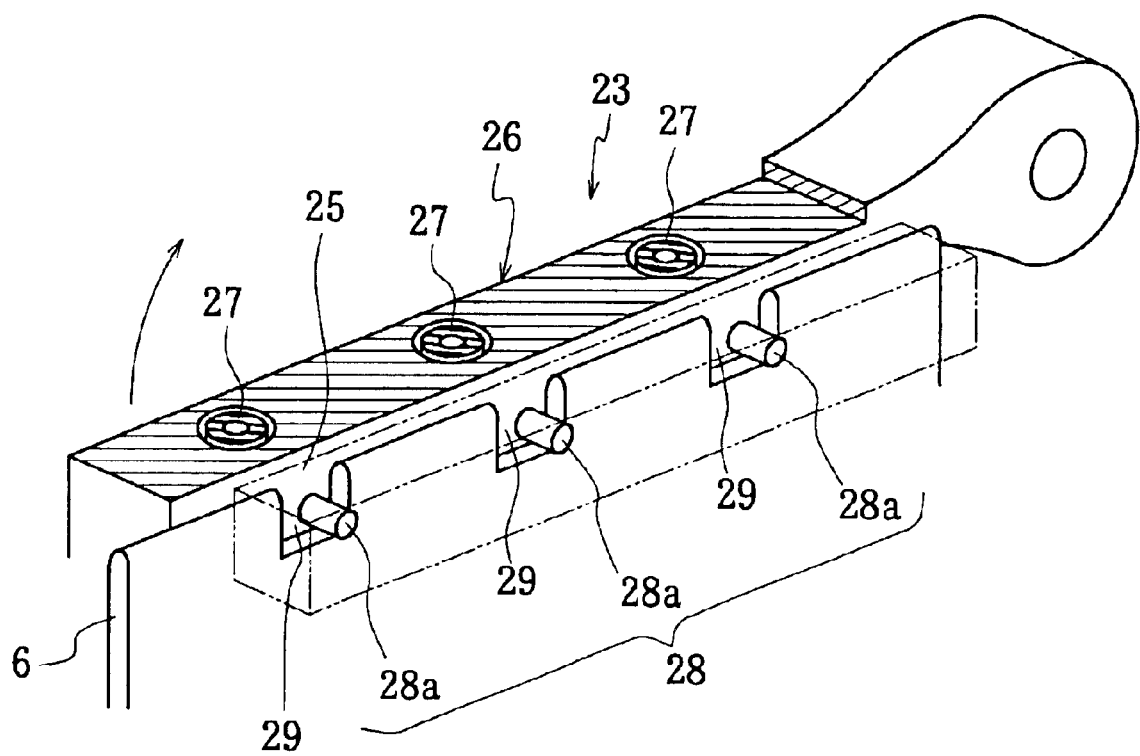
FIG. 6 is a section perspective view illustrating a main part of a pivot arm and a clamper.

At such a state, the clamper 28 arranged on the pivot arm 26 of the extra film removing means 23 is moved forward as shown in FIG. 6, whereby the turnup portion of the film F1 is clamped in the pivot arm at a position not interfering with the insert plate 6. After the completion of such clamping, the backward movement of the insert plate 6 and the operation of the seal means 4 are successively conducted.

The operation of the seal means 4 is carried out by the heating of the impulse sealer 12, for example, for 1–3 seconds and the pushing of the films F1, F2 thereto through the pusher 13, whereby the drawn base film layer of the preceding film F1 and the drawn base film of the front end portion of the trailing film F2 are fuse-sealed in a butt-seam form.

Immediately after the completion of the fuse sealing, the pivot arm 26 of the extra film removing means 23 is pivotably moved in a vertical face to separate the turnup portion of the clamped film from the fuse sealed part, while the fuse sealed part is released from the seal means 4 to feed run the trailing film F2 under the joining of the front end thereof onto the rear end portion of the preceding film F1.

Thereafter, the descending movement of the accumulate roll 7, the descending movement of the lifting block 2 and the releasing and returning of the turnup portion separated from the extra film removing means 23 to original position are carried out at a given order.

Figure 7A:
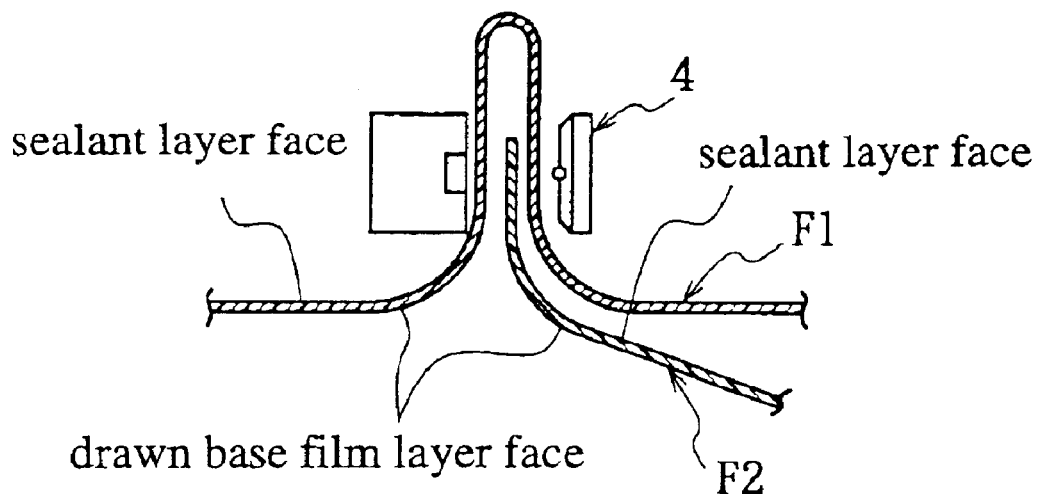
FIGS. 7a and 7b are views
Figure 7B:
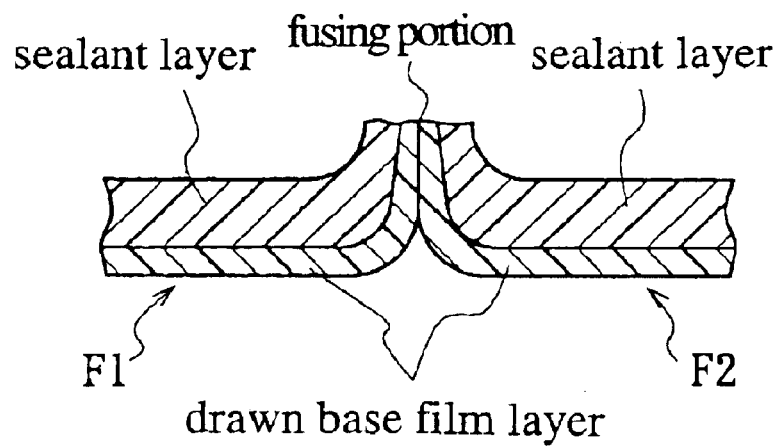

The thus formed fuse-sealed joining is carried out between the mutual drawn base films when the films F1, F2 each comprising the thermoplastic drawn base film layer and the sealant layer are located so as to direct the surface of the drawn base film layer downward as schematically shown in FIG. 7(a) and the joint part takes a form as shown by the enlarged section view in FIG. 7(b). Thus, the strong, airtightness and liquid tightness joining of the mutual drawn base film layers is realized and also substantially the continuous extending form of the sealant layers across both the films F1, F2 is realized.

Therefore, when the feeding posture of the film F1, F2 is at a state of directing the sealant layer face downward, the fuse sealed joint part is produced by fusing the mutual sealant layers in a butt-seam form. In this case, the strong, airtightness and liquid tightness joining is also conducted, and hence the sealant layers are substantially continuously extended across both the films F1, F2.

Figure 8:
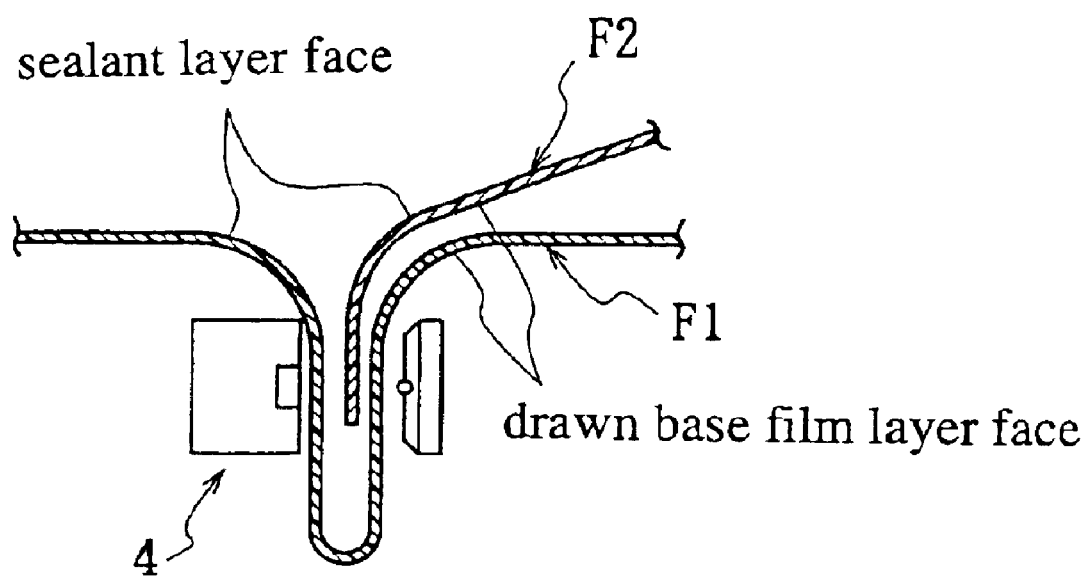
FIG. 8 is a view illustrating another embodiment of joining both films.

Moreover, the mutual fusion of the sealant layers not changing the feeding posture of the films F1, F2 shown in FIG. 7(a) can be carried out by arranging the seal means 4 at a lower side of the running path of the film F1 as shown in FIG. 8.

Although the above is explained with respect to the case that the horizontal running portions of the films F1, F2 are joined, the apparatus and method according to the invention are naturally applicable to the vertical running portion and the slant running portion of the films, respectively.

Figure 9:
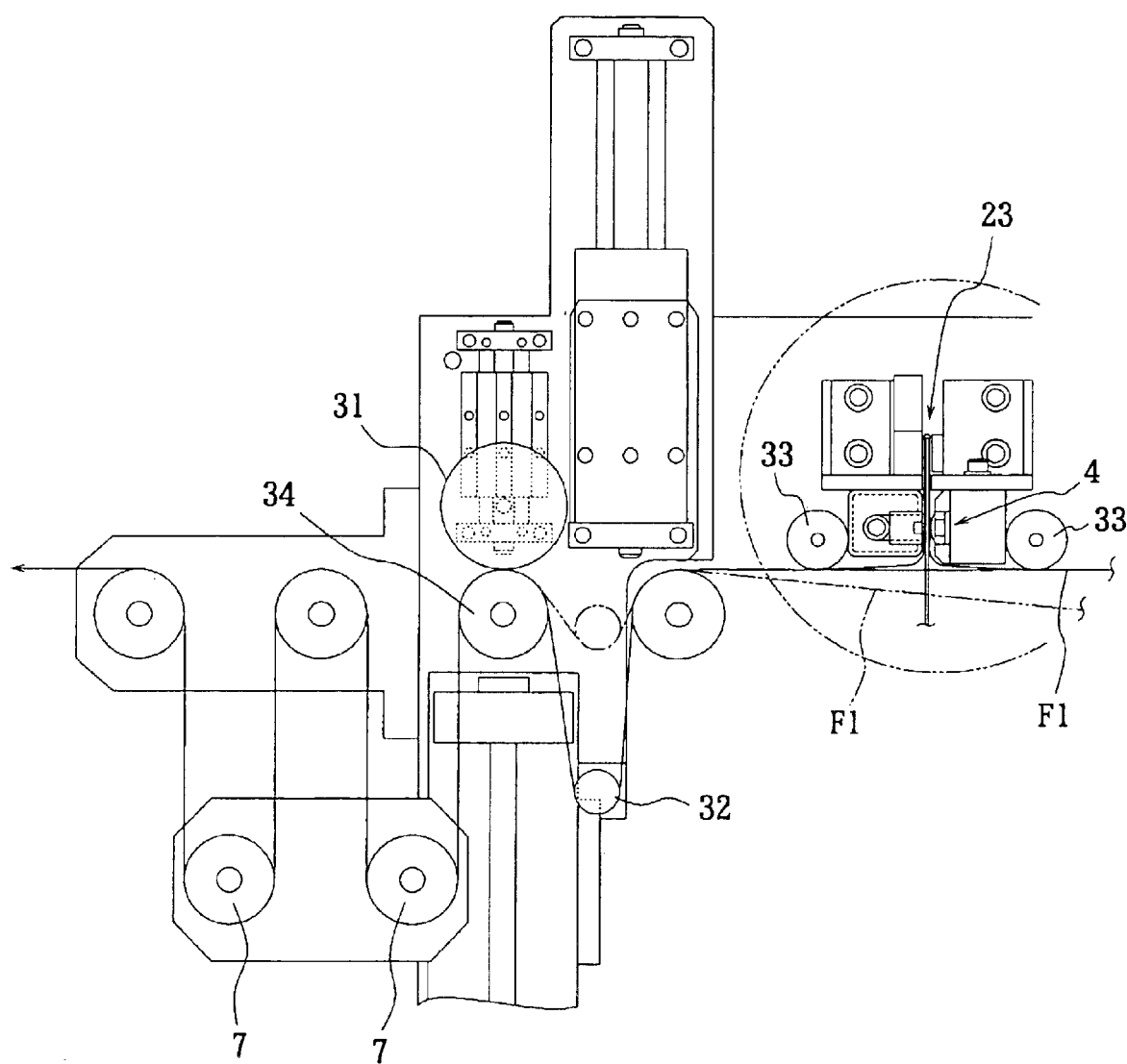
FIG. 9 is a front view of a main part illustrating a modified embodiment of the apparatus shown in FIG. 1.

In another embodiment of the apparatus shown in FIG. 9, the feed running of the film F1 is stopped by clamping it between the seal means 4 and the accumulate roll 7. A non-rotating stop roll 31 is arranged, while a length adjusting roll 32 capable of producing the loosening of the film F1 is arranged between the stop roll 31 and the seal means 4 by moving upward through a cylinder or the like in the illustrated embodiment.

In the figure, numeral 33 is a pair of free rolls arranged at each corner part of the seal means 4. These free rolls 33 do not contact with the preceding film F1 at the posture of usually feed running the film F1 as shown by a phantom line in the figure, but start to run on a path shown by a solid line in the operation of joining the films and contact with the film F1 up to the completion of the film joining operation to prevent the occurrence of friction damage or the like and conduct the film joining operation while suppressing the shifting of the film F1 in the widthwise direction.

Also, a stop roll 31 coupling with a rotatable guide roll 34 is moved downward in correspondence with the timing of starting the upward movement of the accumulate roll 7, for example, accompanied with the start of the film joining operation to clamp the film F1 with a guide rail 34, and prevent the pass of the film F1 through the stop roll 31, whereby all of the film F1 stored in the accumulate roll 7 is fed at a constant speed.

Therefore, the accumulate roll 7 can be moved upward at a constant speed corresponding to the steady feeding of the film F1 up to the completion of the film joining operation and can effectively prevent the occurrence of tension change or the like in the film F1.

On the other hand, the length adjusting roll 32 is moved upward in correspondence with the timing of moving forward the insert plate 6 to generate the loosening of the film F1, whereby the pushing of the film F1 up to the extra film removing means 23 at the turnup posture can be conducted sufficiently smoothly and surely to always realize the sure fuse sealing as is expected without being influenced by elastic modulus of the film F1 and the like.

INDUSTRIAL APPLICABILITY

According to the invention, the joining of the mutual films is carried out, for example, automatically without using a joining material such as an adhesion tape or the like and without mutually overlapping the end portions of the films, whereby excellent liquid tightness and airtightness can be given to the joint portion and a high joining strength can be provided. Also, the joint portion of the film can be fed to heat sealing likewise the other film portion. Therefore, even when the apparatus and method according to the invention are applied to either the slitter step and the packaging step for the film to be packaged, it is useless to temporarily stop the apparatus or the like every time the joint portion of the film reaches to the heat seal blade or the like, and hence the package operation efficiency can be enhanced and the yield of the material can be largely improved.

What is claimed is:

1. An apparatus for joining films by joining a front end portion of a trailing film to a rear end portion of a preceding film, comprising a sealer that fuse-seals both films at a butt-seam state in the vicinity of a film running path, a film holder that holds the front end portion of the trailing film at a side opposite to the sealer with respect to the running path, an insert plate for pushing the front end portion of the trailing film held by the film holder into the sealer together with the preceding film, and an extra film remover that separates a turnup portion of the preceeding film pushed by the insert plate over the sealer at a clamped state from a fuse-sealed portion of the films.

2. An apparatus for joining films according to claim 1, wherein the means sealer is constructed by a heater and a pusher pushing the film to the heater or pushing the heater to the film.

3. An apparatus for joining films according to claim 2, wherein the heater is an impulse sealer.

4. An apparatus for joining films according to claim 1, wherein the film holder is movable forward and backward to the sealer.

5. An apparatus for joining films according to claim 1, wherein the film holder is arranged on a block moving forward and backward to the sealer and is constructed by a clamping plate opening and closing by an actuator or a manual operation.

6. An apparatus for joining films according to claim 1, wherein an actuator moving the insert plate forward and backward to the sealer is arranged on the block.

7. An apparatus for joining films according to claim 1, wherein the extra film remover is constructed by a pivot arm moving in a direction separated away from the sealer and a damper arranged on the pivot arm and moving forward and backward therewith.

8. An apparatus for joining films according to claim 7, wherein the damper is constructed by plural rod-shaped members moving forward through a top notch portion formed on the insert plate.

9. An apparatus for joining films according to claim 1, which comprises at least one accumulate roll guaranteeing the feeding of the preceding film at a given speed during the operation of joining the films.

10. An apparatus for joining films according to claim 9, wherein between the sealer and the accumulate roll is arranged a stop roll clamping the film and stopping the feed running of the film and a length adjuster that generates the loosening of the film is arranged between the stop roll and the sealer.

11. A method of joining films by mutually joining a rear end portion of a preceding film and a front end portion of a trailing film with an apparatus as claimed in claim I, which comprises moving forward the insert plate during the feed running of the preceding film to push the front end portion of the trailing film held by the film holder into the sealer over a given length together with the preceding film, and then clamping a turnup portion of the preceeding film pushed over the position of the sealer by the extra film remover, and thereafter moving the insert plate backward and fusing both the films in a butt-seam by the sealer and further pivotably moving the extra film remover to separate the turnup portion of the preceeding film from a fuse-sealed portion.

12. A method of joining films according to claim 11, wherein the front end portion of the trailing film held by the film holder is moved to a position in the vicinity of the sealer prior to the forward movement of the insert plate.

13. A method of joining films according to claim 11, wherein each of both the films is a film comprised of a thermoplastic drawn base film layer and a sealant layer, and the drawn base film layers of both the films are fused with each other by the sealer.

14. A method of joining films according to claim 11, wherein each of both the films is a film comprised of a thermoplastic drawn base film layer and a sealant layer, and the sealant layers of both the films are fused with each other by the sealer.

15. A method of joining films according to claim 11, wherein each of the films is fused by an impulse fusing seal.

* * * * *

UNITED STATES PATENT AND TRADEMARK OFFICE
CERTIFICATE OF CORRECTION

PATENT NO. : 6,814,827 B2
DATED : November 9, 2004
INVENTOR(S) : K. Futase

It is certified that error appears in the above-identified patent and that said Letters Patent is hereby corrected as shown below:

Column 10,
Line 41, before "sealer" delete "means".

Column 11,
Line 19, after "butt-seam" insert -- formed --.

Signed and Sealed this

Nineteenth Day of July, 2005

JON W. DUDAS
*Director of the United States Patent and Trademark Office*